INVENTORS.
WILLIAM P. OEHLER
HAROLD V. HANSEN
BY
ATTORNEYS

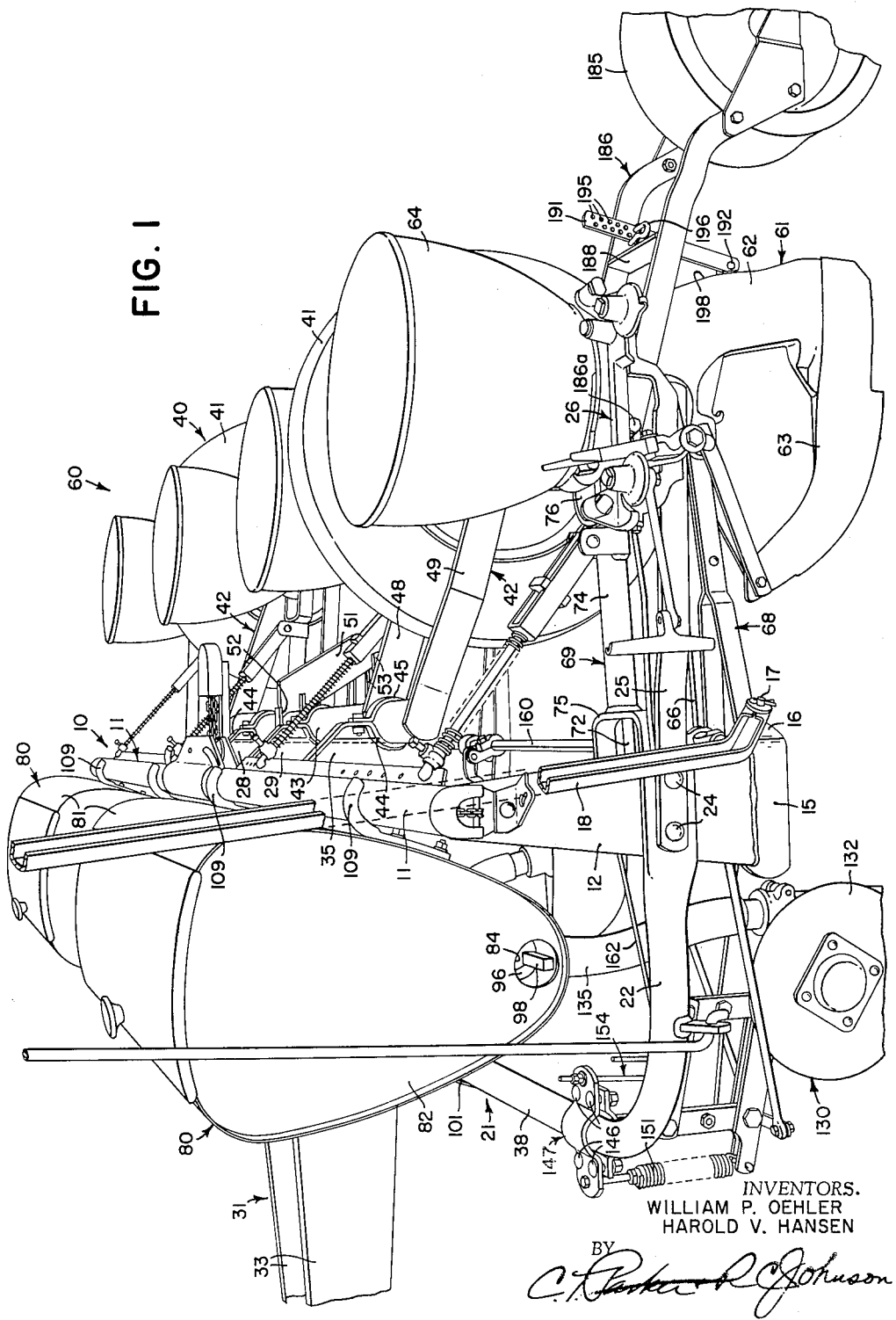
FIG. I
INVENTORS.
WILLIAM P. OEHLER
HAROLD V. HANSEN
BY
ATTORNEYS March 21, 1961   W. P. OEHLER ET AL   2,975,844
PLANTER MECHANISM Filed Dec. 31, 1956   2 Sheets-Sheet 2

… …

United States Patent Office 2,975,844
Patented Mar. 21, 1961

2,975,844

PLANTER MECHANISM

William P. Oehler, Moline, and Harold V. Hansen, Hillsdale, Ill., assignors, by mesne assignments, to Deere & Company, a corporation of Delaware Filed Dec. 31, 1956, Ser. No. 631,586

6 Claims. (Cl. 172—484)

The present invention relates generally to agricultural implements and more particularly to seeding implements, especially those equipped with means for applying fertilizer along with the planting of the seed.

The object and general nature of the present invention is the provision of a new and improved planter for row crops. More specifically, it is a feature of this invention to provide new and improved operating linkages for actuating the seed and fertilizer valves, and it is a further feature of this invention to provide a planter in which the fertilizer furrow openers and associated parts are disposed a substantial distance ahead of the associated planter shanks and associated parts, the valve operating mechanisms being so constructed and arranged that the seed is deposited, as when hill drop planting or check rowing, closely adjacent the point on the ground where the fertilizer was deposited.

Another feature of this invention is the provision of new and improved linkages connecting the fertilizer furrow openers with the forward portion of a planter frame, the parts being so constructed and arranged that the several furrow openers have individual movement, but all are raised when the planter frame is raised, as for transport or the like.

Another feature of this invention is the provision of new and improved press wheel adjusting means, which means also is so constructed and arranged that when the frame is raised, as for transport, the press wheels are also raised. Additionally, the construction is such that the press wheels have a limited amount of permissive movement relative to the associated planter shanks, whereby even though the latter may momentarily be forced out of the ground, as by an obstruction, such as a stone or the like, lying just underneath the surface of the ground, the press wheel normally remains in contact with the ground and performs its pressing function. As a result of this arrangement, the seeds deposited while the planter shank is momentarily raised, are pressed, at least to a certain extent, into the soil to facilitate their subsequent germination.

These and other objects and advantages of the present invention will be apparent to those skilled in the art after a consideration of the following description of the preferred structure in which the principles of the present invention have been incorporated.

In the accompanying drawings:

Fig. 1 is a perspective view of a four-row planting and fertilizer distributing implement in which the principles of the present invention have been embodied.

Figure 2:
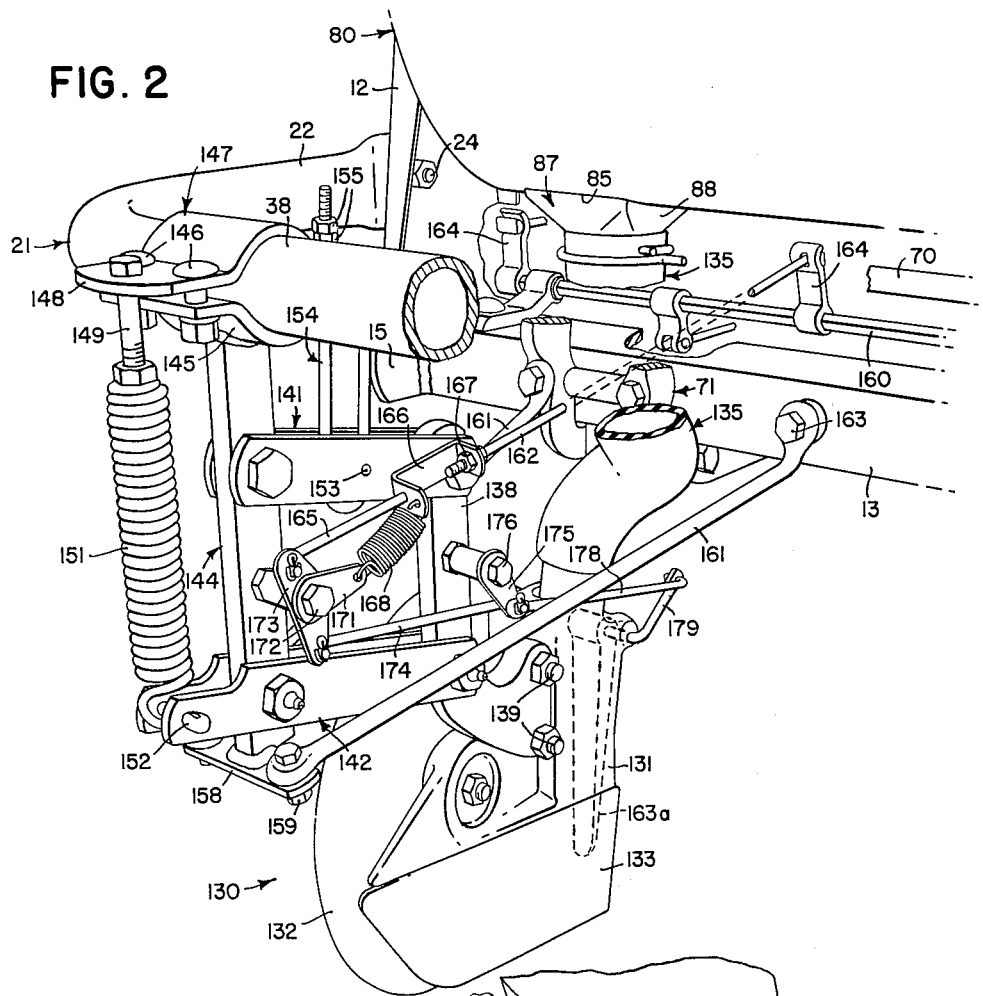
Fig. 2 is an enlarged fragmentary perspective view of the fertilizer furrow opener and associated connecting and operating mechanism.
Figure 3:
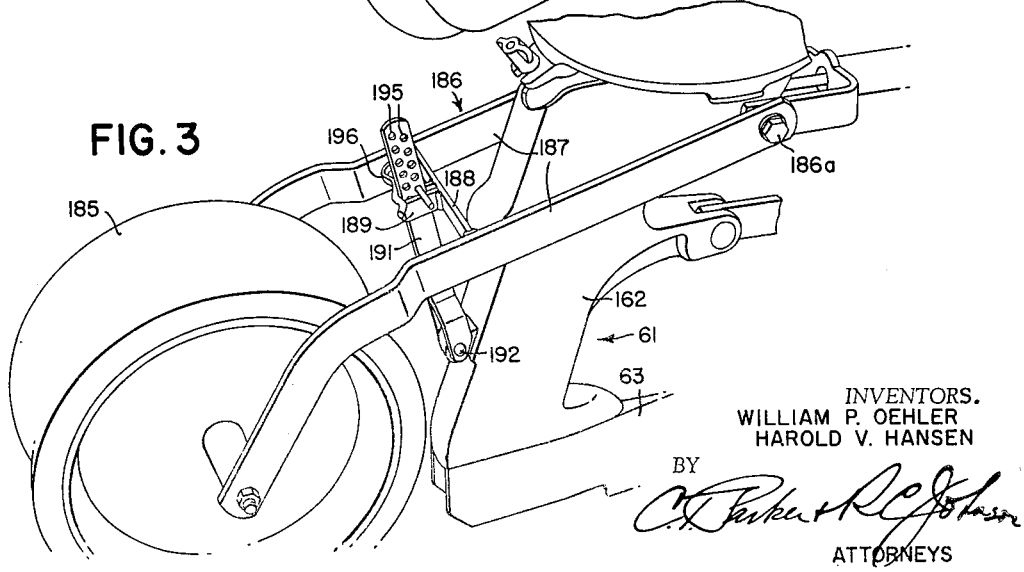
Fig. 3 is a fragmentary perspective view showing the press wheel construction and a portion of the associated planter shank.

The planter of the present invention, as best shown in Fig. 1, comprises a main frame 10 that is made up of an upper sill bar, preferably in the form of a pipe, shown at 11, a pair of vertical end sections 12, generally triangular in configuration and secured in any suitable way, as by welding, at their upper ends to the ends of the upper sill pipe 11. The frame 10 also incudes a lower transverse frame member 13, preferably in the form of an angle that extends from one end to the other of the frame 10, each end being secured, as by welding, to the lower end of the associated end section 12 through a transverse part 15 that has one end 16 extended rearwardly and laterally inwardly, carrying a stud 17 that forms the bearing for the associated marker arm 18, only the lower portion of which is shown in Fig. 1. The part 15 is also securely fixed, as by welding, to the lower or base portion of the associated end section 12. The main frame 10 also includes a front pipe member 21 having its ends bent rearwardly, as indicated at 22, and flattened so as to fit against the outer face of the associated end section 12. The flattened section is apertured to receive a pair of attaching bolts 24 that also extend through apertures in the associated end section 12, and the bolts 24 also pass through the forward portion of an associated check head support bar 25 which at its rear end carries a check head 26 which is conventional, so far as the principles of the present invention are concerned, being constructed substantially like the check head shown in the U.S. Patent 2,315,752 which issued April 6, 1943 to Charles H. White. Other vertical members, such as those indicated at 28 and 29, Fig. 1, cooperate with the end sections and rigidly secure the lower sill angle 13 to the upper sill pipe member 11 to form a rigid structure. The frame 10 further includes a draft frame section 31 that comprises a pair of forwardly extending generally vertically arranged plates 33, the rear ends of which are detachably secured in any suitable way to the intermediate vertical frame sections 28 and 29. The frame 10 also includes other intermediate vertical frame sections 35, to provide the desired rigidity in the frame 10. Preferably, the intermediate vertical sections 28, 29 and 35 are shaped to fit against the lower frame angle 13 and are welded thereto. The forward pipe member 21 is made up of right and left hand sections 38, each having its laterally inner end suitably connected to the associated draft frame member 33.

The implement shown in Fig. 1 is in the nature of a towed planter, the forward ends (not shown) of the draft frame members 33 being connected by suitable hitch means with a farm tractor or other suitable propelling means. The main frame 10 is raised and lowered into and out of transport and operating positions by virtue of ground-engaging means 40 that includes a pair of ground wheels 41 carried on a pair of wheel arms 42 that are fixed at their upper and forward ends to a rockable shaft member 43, preferably in the form of a pipe, journaled in pairs of inner and outer bearing brackets 44 and associated bearing straps 45 suitably bolted together and secured, as by welding, to the associated vertical frame sections 28, 29 and 35. Each wheel arm 42 includes an inner member 48 and an outer member 49 receiving the associated wheel 41 therebetween and secured, as by welding, to the rockable pipe member 43, preferably with the outer bearing parts 44 and 45 disposed between the members 48 and 49. An actuating arm 51 is securely fixed as by welding at its upper end to the generally central portion of the rockable pipe member 43, the connection being reenforced by a U-shaped strap 52 also welded to the arm 51 and to the pipe member 43, and the lower end of the arm 51 is apertured to receive a pair of straps 53 or other suitable means forming a forwardly extending link connected or adapted to be connected to a suitable operating mechanism, such as a hydraulic cylinder actuated by power derived from and normally operated by means on the tractor for controlling implements. By virtue of such means, a force is exerted against the arm 51 to swing the wheel frame 42, 43, thus raising and lowering the implement as a unit relative to the ground.

The implement shown in Fig. 1 is provided with both seeding means and fertilizing means. The seeding means is indicated in its entirety by the reference numeral 60 and comprises a plurality of planting units 61, each including a generally vertically disposed shank casting 62 carrying at its lower end a furrow opening runner 63 and at its upper end a seed hopper 64 and associated seed-selecting and dispensing mechanism (not shown), which may be of any suitable construction, preferably like that shown, for example, in the U. S. Patent 2,340,163, issued January 24, 1944 to Charles H. White. As shown in the latter patent, such a planting unit includes suitable valve means operated by a link 66 (Fig. 1) that extends forwardly generally in parallelism with respect to lower link means 68 and upper link means 69 that connect each shank casting 62 with the associated frame 10. Preferably, the forward ends of the link members 68 and 69 are connected to an associated generally vertically disposed bracket 71 (Fig. 2) fastened in any suitable way to the lower sill angle 13 of the frame 10. There is, of course, one bracket 71 for each planting unit 61, and the construction generally is similar to that shown in U.S. Patent 2,376,464, issued May 22, 1945 to Charles H. White. Therefore, further description appears to be unnecessary except to point out that the several brackets 71 support a transversely extending drill shaft 70 that is connected through suitable gearing to drive a seeding shaft 72 that extends rearwardly to the seed dispensing mechanism in each of the planting units 61. The upper link 69 is in the nature of a pipe 74 through which the associated seeding shaft 72 extends, with front and rear yokes 75 and 76 pivotally connected to the associated bracket 71 and the forward portion of the runner shank 62, respectively.

The fertilizer dispensing means incorporated in the present implement comprises a pair of transversely elongated fertilizer hoppers or containers 80. Each includes a hopper sheet 81 that is rolled to fit generally oval-like end plate 82. At the lower portion each end plate 82 of each hopper is provided with an opening 84, and closely adjacent each opening 84 the lower portion of the sheet 81 is provided with an opening 85, as best shown in Fig. 2. At each end of the hopper 80 the latter carries a fertilizer spout member 87, each member being in the form of a casting that includes a spout section 88. Distributing means in the form of an auger is disposed in the bottom of each hopper. The auger comprises a plurality of right and left hand auger sections 96, preferably in the form of castings, and a shaft 98 that is square in cross section and extends through correspondingly formed openings in the auger castings 96.

From Fig. 1 it will be noted that there are two planter units disposed substantially directly behind each elongated fertilizer hopper 80. Each hopper is supported for forward and downward swinging movement on the transverse portion of the front frame pipe member 21 by hinge means 101. Hook members 109 are fixed to the rear side of the hopper 80 and engage over the upper portion of the associated upper sill pipe 11 when the hopper is in its normal or vertical position, as shown in Fig. 1.

As mentioned above, there are two hoppers 80 for the four planting units 60, and each hopper includes its own agitator and distributing means. The planting means 60 includes jackshaft means (not shown) that is driven in any suitable way from the ground wheels 41. The jackshaft drives various mechanisms of the implement, including the drill shaft 70 and the fertilizer distributing means 96, 98.

According to the principles of the present invention the planter implement 10 includes a fertilizer furrow opening unit 130 mounted substantially directly ahead of each of the planting units 61. Each fertilizer furrow opening unit 130 comprises a fertilizer boot casting 131 carrying a rotatable disk 132 and associated plate runner 133. The fertilizer boot casting 131 includes a fertilizer passage to the upper end of which a fertilizer tube 135 is connected in any suitable way. The upper end of the tube is connected to the associated spout casting 87 that is fixed in any suitable way to the associated fertilizer hopper 80. Fixed to each fertilizer boot casting 131 is a generally upwardly extending standard 138 that is secured in place by any suitable means, such as a pair of bolts 139. A pair of parallel link members 141 and 142 are pivotally connected at their rear ends with the standard 138, and at the forward ends the link members 141 and 142 are pivotally connected to a depending bracket member 144 that is rigidly fixed to the associated front frame pipe member 38. To this end, the upper end of each bracket 144 carries a transverse or fore-and-aft extending saddle strap 145 that is apertured to receive bolts 146 by which the front and rear portions of an associated clamping cap member 147 is firmly and rigidly secured in place. The cap member has front and rear extensions 148, the front extension being apertured to receive an adjusting bolt 149 by which the upper end of a spring 151 is connected therewith. The lower end of the spring 151 is connected by a cotter 152 with the forwardly extending portion of the lower link 142. The upper link 141 carries a transverse pin 153 which is received by a U-shaped link member 154, the upper end of which is screw-threaded and fixed, as by lock nuts 155, to the rear extended portion of the clamping cap member 147, as best shown in Fig. 2. The lower end of the bracket 144 carries a transverse strap 158 the ends of which are apertured to receive bolt means 159 by which a pair of brace rods 161 are connected thereto. The rear ends of the brace rods are connected, as by bolt means 163, with the transverse frame angle 13. By virtue of this construction, each furrow opener unit 130 is connected for generally vertical floating movement to the planter frame, the amount of available down pressure exerted by the spring 151 being capable of being varied or adjusted by the adjusting bolt 149. When the planter frame is raised, as for transport, by swinging the wheel frame 41—43 downwardly, the fertilizer furrow openers swing downwardly until they are stopped by the U-shaped link stops 154, after which the fertilizer furrow openers are raised with the implement frame and other parts.

As mentioned above, the valves and other parts of the planting units are operated by the links 66, and the latter, in turn, are operated when check rowing or hill dropping by a rockshaft 160. The means for operating the rockshaft 160 is conventional, so far as the present invention is concerned, and hence need not be illustrated. Arms 164 are also mounted on the rockshaft 160 and are connected by associated links 162 to operate the valve 163a in each fertilizer unit 130. For this purpose, the valve operating link 162 is provided with an extension 165 which is adjustable relative to the main portion of the rod 162 by means of a yoke 166 and adjusting means 167. A spring 168 is connected between the forward portion of the yoke 166 and a link 171 that is mounted on a pivot 172 that is carried by the bracket 144. Also mounted on the pivot 172 is a lever 173 disposed in a generally vertical position and connected at its upper end with the rod extension 165. At its lower end the lever 173 is pivotally connected with a fertilizer valve operating link 174 that at its rear end is swingably supported on an arm 175 carried on a pivot 176 that is mounted on the vertically extending standard 138. A second link 178 is connected with the swinging arm 175 and the link 174 and at its rear end is connected to an arm 179 that is connected with or forms a part of the fertilizer valve 163a.

As can best be seen from Fig. 2, whenever the rockshaft 160 is operated to open the planter valve means, the fertilizer valve 163a is also operated, and this occurs in any position of the fertilizer opener unit, for, as shown in Fig. 2, the link 174 is disposed generally parallel with the connecting link means 141 and 142 and, further, the length of the link 174 approximates that of the link means 141 and 142, the pivots 172 and 176 being mounted on the parts 144 and 138 to secure this result.

It will be seen from Fig. 1 that the fertilizer opener unit is a considerable distance ahead of the associated planter opener unit, and this spacing is so correlated with the normal speed of forward travel of the planter and the rapidity of operation of the rockshaft 160 that while fertilizer and seed are deposited substantially at the same time, the interval between the positions is such that the forward travel carries a planting furrow opener forwardly to a position substantially coinciding with the point at which fertilizer was deposited at the preceding actuation.

Each planting unit 61 is provided with a press wheel 185 supported in the press wheel frame 186 that is pivotally connected, as at 186a, to the upper portion of the planter shank 162. The press wheel frame comprises right and left hand bars 187 suitably interconnected by a cross bar 188. The latter carries a yoke 189 that slidably receives the upper end of a strut 191, the lower end of which is pivotally connected, as at 192, to the rear portion of the shank 62. The upper portion of the strut 191 is provided with a plurality of apertures 195 in any one of which a hairpin stop member 196 may be disposed. The stop 196 overlies the yoke 189, and by disposing the stop pin 196 in different openings 195, the relation between the press wheel and the planter shank may be adjusted, as desired, the weight of the planter shank and associated part being supported at least partially on the press wheel through the strut 191 and associated connections with the bar 186 on the press wheel frame.

The press wheel frame 186 is capable of moving downwardly relative to the planter shank 162 an amount that is limited by a stop 198, shown as an adjacent portion of the shank, which in the lowermost position of the planter press wheel frame 186, relative to the shank 62, as when the planter is raised, is engaged by the bar 188. Thus, when in operation the planter runner 63 encounters a hard spot, obstruction or the like that lies just underneath the ground surface, the planter unit may momentarily be lifted but at least the weight of the press wheel and the press wheel frame is still available to press the seed into the ground as the unit passes over the obstruction. If, for example, the press wheel frame were rigidly connected to the planter shank, the press wheel would be lifted entirely out of contact with the ground during the time the runner passed over the obstruction, which would leave seed on the ground that would not be pressed into the ground.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In an agricultural implement, a frame comprising an upper transverse bar, a lower transverse bar, vertical parts connecting the ends of said bars, a forwardly disposed transverse bar, and means connecting the end portions of said forward bar with said vertical parts, a pair a generally vertical furrow opener brackets fixed at their upper ends to said forward bar, furrow openers, each including an upwardly extending standard, said furrow opener brackets extending downwardly past the upper portions of said standards, generally fore-and-aft extending upper and lower links connecting said standards, respectively, with said brackets, brace means extending between the lower ends of said brackets and said lower transverse bar, and means fixing the said brace means to said lower ends and said lower transverse bar.

2. The invention set forth in claim 1, further characterized by said brace means including a pair of brace members for each bracket, each pair of brace members connected at their forward ends to the lower end of the associated bracket, and means connecting each furrow opener to the associated bracket and disposing the furrow opener in between the associated brace members.

3. In an agricultural implement, a frame including a frame bar, ground engaging supporting means movably connected with said frame, means connected with said supporting means to shift the latter relative to the frame so as to raise and lower said frame, a generally vertical furrow opener bracket, a furrow opener, upper and lower link means swingably connected with said bracket and said furrow opener, means including an upper part extending transversely of said frame bar for connecting the upper end of said bracket to said frame bar, spring means disposed at one side of said frame bar and connected to act between one end of said transverse part and one of said link means to urge said furrow opener downwardly, and stop means disposed at the other side of said frame bar and connected to act between one of said link means and the other end of said transverse part to limit downward movement of said furrow opener when said ground engaging means has been moved to raise said frame.

4. In an agricultural implement, a frame comprising an upper transverse bar, a lower transverse bar, vertical parts connecting the ends of said bars, a forwardly disposed transverse bar, and means connecting the end portions of said forward bar with said vertical parts, a generally vertical furrow opener bracket having at its upper end a transverse saddle section shaped to receive the adjacent portion of said forwardly disposed transverse frame bar, a clamping cap member disposed across said latter transverse frame bar and connected to said saddle section so as to fix said bracket to said forward transverse frame bar generally forward of said lower transverse frame bar, a furrow opener disposed generally between said vertical furrow opener bracket and said lower transverse frame bar and movably connected with said vertical bracket, generally horizontal brace means connecting the lower end of said bracket with said lower transverse frame bar, means connected with one end of said cap member to urge said furrow opener downwardly, and means connected with the other end of said cap member to limit the downward movement of said furrow opener.

5. In an agricultural implement, a frame comprising a lower transverse bar, a forwardly disposed transverse bar, and means connecting the end portions of said bars whereby the forward bar lies above said lower bar, a generally vertical furrow opener bracket having at its upper end a transverse saddle section shaped to receive the adjacent portion of said forwardly disposed transverse frame bar, a clamping cap member disposed across said latter transverse frame bar and connected to said saddle section so as to fix said bracket to said forward transverse frame bar generally forward of said lower transverse frame bar, a furrow opener disposed generally between said vertical furrow opener bracket and said lower transverse frame bar and movably connected with said vertical bracket, generally horizontal brace means connecting the lower end of said bracket with said lower transverse frame bar, means connected with one end of said cap member to urge said furrow opener downwardly and means connected with the other end of said cap member to limit the downward movement of said furrow opener.

6. The invention set forth in claim 5, further characterized by a pair of rearwardly divergent braces fixed to the lower portion of said bracket and the adjacent portion of said lower transverse frame bar.

References Cited in the file of this patent

UNITED STATES PATENTS

| | | |
|---|---|---|
| 601,870 | Davison | Apr. 5, 1898 |
| 655,334 | Falconer | Aug. 7, 1900 |
| 1,021,042 | Heylman | Mar. 26, 1912 |
| 1,165,735 | Wentz | Dec. 28, 1915 |
| 2,416,189 | McIntyre | Feb. 18, 1947 |
| 2,701,513 | Hyland et al. | Feb. 8, 1955 |
| 2,731,900 | Oehler | Jan. 24, 1956 |

FOREIGN PATENTS

| | | |
|---|---|---|
| 66,307 | Denmark | Jan. 26, 1948 |